Nov. 5, 1963 I. T. POPE 3,110,004

FREQUENCY SELECTOR USING VOLTAGE-SENSITIVE CAPACITORS FOR TUNING AND BANDWIDTH CONTROL

Filed April 21, 1961

INVENTOR.
IRA T. POPE.
BY Alden D. Redfield
Irwin P. Garfinkle
ATTORNEYS.

United States Patent Office 3,110,004

Patented Nov. 5, 1963

3,110,004

FREQUENCY SELECTOR USING VOLTAGE-SENSITIVE CAPACITORS FOR TUNING AND BANDWIDTH CONTROL

Ira T. Pope, Cincinnati, Ohio, assignor to Avco Corporation, Cincinnati, Ohio, a corporation of Delaware Filed Apr. 21, 1961, Ser. No. 104,713

5 Claims. (Cl. 334—15)

This invention relates to electronic frequency selectors in which the coupling, impedance, and bandpass characteristics of a multiple tuned reactance filter are controlled.

The electronic frequency selector of this invention is capable of selecting a particular narrow bandpass channel from a relatively broad frequency, and it is susceptible to remote and automatic control. In an embodiment of this invention as reduced to practice in a single side band communication system, the frequencies were in harmonic ratio and elimination of all but the desired harmonic was required while maintaining conditions of matched input and output impedance across the spectrum bands. In addition, a considerable reduction in the size of the components was effected.

Briefly stated, this invention comprises a multisection tuned radio frequency selector wherein the passband and the input and output impedances are maintained constant by similar and simultaneous adjustments of the capacitance in the tuned circuits. Preferably the capacitance elements comprise diodes whose capacity varies as a function of applied voltage. The invention is particularly adapted to remote operation and can be used to incorporate automatic frequency control with automatic or programmed channel selection.

The primary object of this invention is to provide an electronically tuned frequency selector which may be step or continuously varied by manual, programmed, or automatic drive means.

Another object of this invention is to provide an electronically tuned frequency selector in which input and output impedances and bandpass characteristics are maintained essentially constant over a broad range of frequencies.

Another object of this invention is to produce a multiple tuned reactance filter in which the coupling, impedance, and bandpass characteristics are controlled directly by semi-conductor diode elements to which a varying voltage is applied.

Another object of this invention is to provide a filter network including capacitance elements, the capacity of which varies as a function of applied voltage and to vary the frequency of said network by controlling the voltage applied to said capacitance elements.

Another object of this invention is to provide an electronically tuned frequency selector comprising a filter having constant impedance and bandpass characteristics and which is adapted to remote, accurate, and rapid tuning which is reduced in size and weight and which provides improved performance and reliability.

Still another object of this invention is to provide a frequency selector system with no moving parts and wherein frequency selection is accomplished by the application of direct current potentials to diodes functioning as variable capacitors.

For other objects and advantages of this invention, reference should now be made to the following specification and to the accompanying drawing in which.

Figure 1:
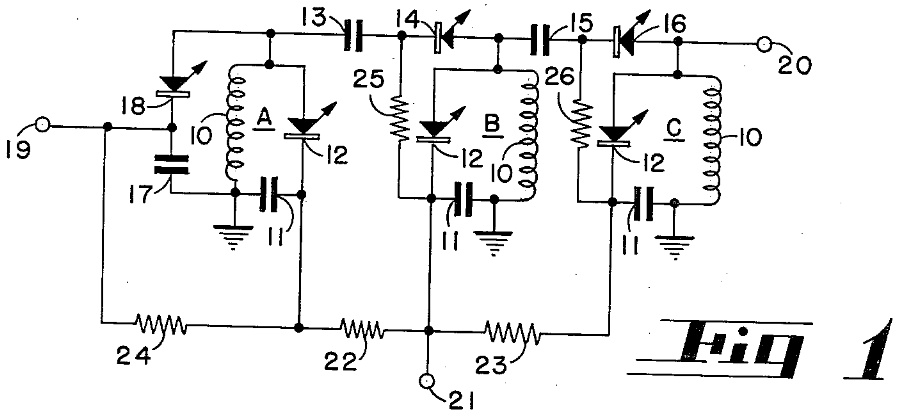
FIG. 1 represents a preferred embodiment of this invention.

The embodiment of FIG. 1 illustrates a filter having three sections, A, B, and C. It will be understood, however, that any number of sections may be used depending on passband requirements, and a single side band receiver in which the invention was reduced to practice incorporated filters having five to fifteen sections. Each section includes a fixed inductor 10 across which are connected a fixed capacitor 11 and a variable capacity diode 12, commonly known as a varicap or a varactor. A fixed capacitor 13 and a variable capacity diode 14 are connected in series between the sections A and B of the filter while a fixed capacitor 15 and variable capacity diode 16 are connected in series between the sections B and C.

The input circuit for the filter network comprises a capacitive voltage divider including a fixed capacitor 17 and a variable capacity diode 18 connected in series across the fixed inductor 10 in section A, the input being applied across the capacitor 17 between the terminal 19 and ground. The output from the filter network is derived from between the terminal 20 and ground.

Tuning for the system is accomplished by applying a variable direct current voltage from a variable direct voltage supply available at a terminal 21. The variable capacity diodes 12 in sections A and C are connected to the terminal 21 through resistors 22 and 23 respectively, while the diode 12 in section B is directly connected to the terminal 21. In addition, a variable direct current voltage is supplied to the diode 18 in the capacitive voltage divider through a resistor 24, while each of the diodes 14 and 16 are connected to the supply through resistors 25 and 26 respectively.

The characteristic of each of the diodes in the circuit is such that its capacity decreases with an increase in voltage. Hence, an increase in voltage at the terminal 21 results in a decrease in the capacity of the diodes 12 and in the capacity of diodes 14 and 16. This decrease in capacity results in a corresponding increase in the resonant frequency of the system. It will also be noted that the decrease in capacity of the diodes 14 and 16 has the effect of decreasing the percentage bandwidth of the network. However, since the resonant frequency of the network is increased, proper selection of the capacitors 13 and 15 and diodes 14 and 16 will permit a proper capacity change of the diodes 14 and 16 to produce a resultant constant bandwidth.

Furthermore, by applying an increased positive voltage to the cathode of the diode 18, the capacity of that diode is reduced and thus, the over-all capacity of the voltage divider network which includes the diode 18 and capacitor 17 is changed to produce a variation in impedance which compensates for the impedance change resulting from a change in frequency, thereby maintaining a proper impedance match at the input terminal 19. For example, an increase in frequency would tend to increase the over-all impedance of the filter network as viewed from the terminal 19. However, the increase of voltage on the diode 18 decreases the capacity of that element and thereby reduces its impedance to maintain a relatively constant input impedance.

If the voltage applied to the diodes 12, 14, 16, and 18 is decreased, corresponding adjustments are made to the circuit for operation at a reduced frequency.

Figure 2:
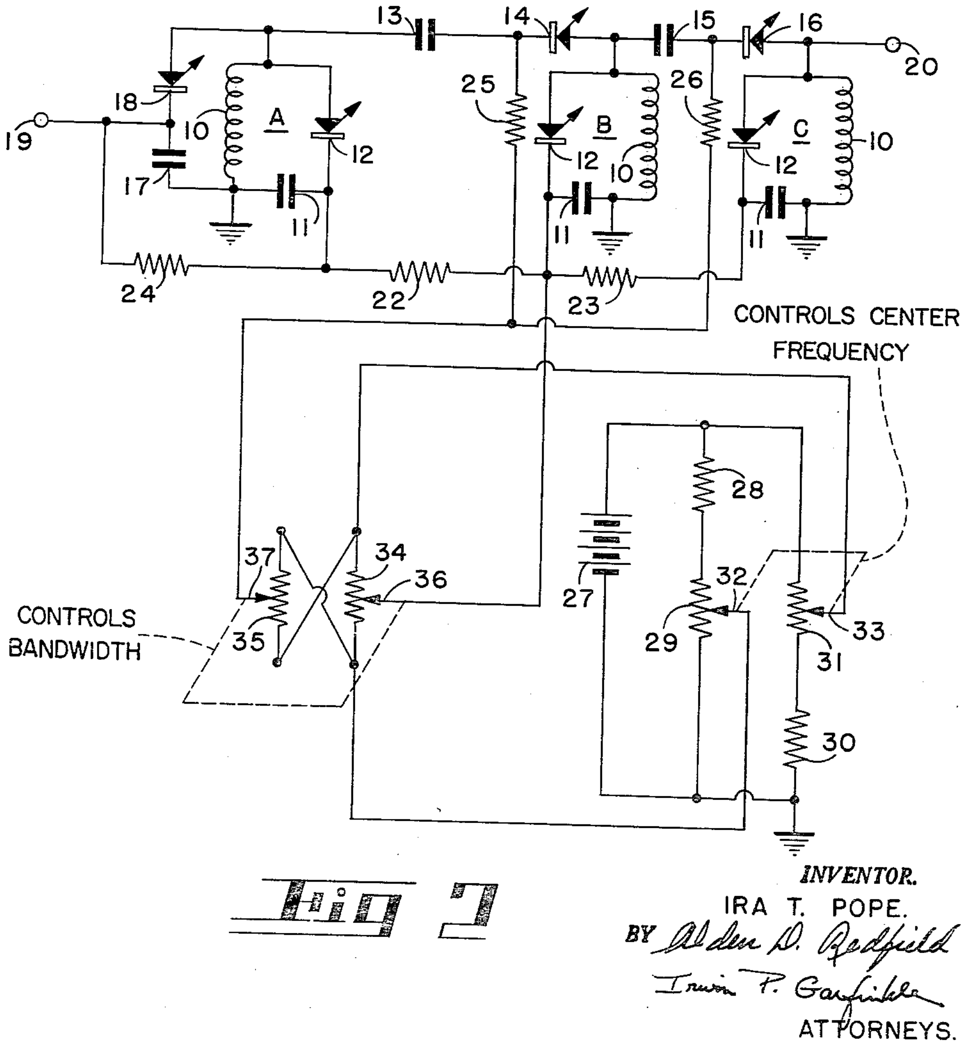
FIG. 2 represents a second preferred embodiment of this invention incorporating a biasing network for maintaining a constant bandpass characteristic.

The embodiment of the invention illustrated in FIG. 2 comprises a filter network which is essentially identical to that shown in FIG. 1 with the exception that the direct current biasing arrangement in FIG. 2 is provided with refinements for providing a variable bandwidth if desired. Thus in FIG. 2 I provide a battery 27 across which are connected resistors 28 and 29 and resistors 30 and 31, and the voltage difference appearing between the movable taps 32 and 33 of resistors 29 and 31 respectively is applied across each of two resistors 34 and 35.

The voltage at the movable tap 36 of resistor 34 is connected to the junction of resistors 22 and 23 to provide the bias potential for the diodes 12 in the sections A, B, and C, and for the diode 18. The movable tap 37 of resistor 35 is connected to each of the resistors 25 and 26 to provide the biasing potential for the series diodes 14 and 16.

It will be noted that the movable taps 32 and 33 are ganged together for simultaneous movement while the taps 36 and 37 are similarly ganged. Because of the criss-cross parallel connection of the resistors 34 and 35, simultaneous movement of the taps 36 and 37 will cause the voltage in those taps to vary in opposite directions. Thus with all the taps set in a predetermined position to establish an initial condition of frequency, passband, and impedance, if the taps 36 and 37 are moved to a new position where, for example, the voltage at the tap 36 increases in a positive direction, a corresponding decrease results at the tap 37. The increased voltage at tap 36 now applied to each of the diodes 12 decreases the capacity of those diodes and thereby increases the upper limit of the frequency of the band. The simultaneous application of the decreased voltage appearing at the tap 37 applied to the diodes 14 and 16 has the effect of increasing the capacity of those diodes, and thereby decreasing the lower frequency limit of the band. The simultaneous increase in the upper and lower limits of the band thus provides an increase in the bandwidth without moving the center frequency of the band. Movement of the taps 36 and 37 in the opposite direction will reduce bandwidth, while maintaining a constant Q and center frequency.

To change to a new center frequency, the taps 32 and 33 are simultaneously moved, and if the taps 36 and 37 remain unchanged, there will be no change in bandwith. As in the embodiment of FIG. 1, the application of an increased or decreased voltage to the diode 18 (by movement of taps 32 and 33, or 36 and 37 or both) decreases or increases the capacity of that element and thus changes the ratio of the capacity of the diode 18 to the capacitor 17, and thus compensates for the change in impedance of the network due to the decrease in capacity of the diodes 12, to produce a relatively constant input impedance.

For the purpose of enabling persons skilled in the art to reconstruct this invention, the following circuit parameters were used in an embodiment actually reduced to practice.

| | |
|---|---|
| Inductors 10: | |
| Section A | 8.0 μh. |
| Section B | 4.0 μh. |
| Section C | 4.0 μh. |
| Capacitor 11 | .01 μf. |
| Capacitor 13 | 12 mmf. |
| Capacitor 15 | 12 mmf. |
| Capacitor 17 | 100 mmf. |
| Battery 27 | 50 v. power supply. |
| Diodes 12: | |
| Section A | Type EC–1007. |
| Section B | Type EC–1006. |
| Section C | Type EC–1006. |
| Diode 14 | Type PC–115–10. |
| Diode 16 | Type PC–115–10. |
| Diode 18 | Type PC–115–10. |
| Resistor 22 | 1.2 K ohms. |
| Resistor 23 | 1.2 K ohms. |
| Resistor 24 | 4.7 K ohms. |
| Resistor 25 | 100 K ohms. |
| Resistor 26 | 100 K ohms. |
| Resistor 28 | 1.0 K ohm. |
| Resistor 29 | 10 K ohms. |
| Resistor 30 | 1.0 K ohm. |
| Resistor 31 | 10 K ohms. |
| Resistor 34 | 100 K ohms. |
| Resistor 35 | 100 K ohms. |

It is to be understood that this invention is in no way limited by the foregoing circuit parameters and that many variations and adaptations in values and circuit design are possible within the spirit and scope of the invention as defined by the following claims.

What is claimed is:

1. A multiple tuned reactance filter comprising: a plurality of tuned tank circuits, each of said tuned tank circuits incorporating a variable reactance device; a reactive coupling network between each of said tank circuits for coupling said tank circuits in tandem, each of said coupling networks including a variable reactance device; a reactive voltage divider connected across the first of said tank circuits in said filter, said voltage divider including another of said variable reactive impedance devices in series with a fixed reactive device, each of said variable reactance devices in said tank circuits, said coupling network and said voltage divider having characteristics such that its reactive impedance varies as a function of applied direct voltage; means connecting a variable direct current source of voltage to each of said variable reactance devices for simultaneously increasing or decreasing the reactance of said devices whereby the resonant frequency of said filter is adjusted while the band pass of said filter remains substantially constant, and whereby the reactive impedance of said voltage divider is adjusted to maintain a relatively constant input impedance for said filter as the resonant frequency is adjusted.

2. The invention as defined in claim 1 wherein each of said coupling networks also comprises a frequency-dependent shunt connected across said tank circuit, said frequency-dependent shunt including a fixed capacitor and a resistor in series, said variable reactance device in said coupling network being connected from between the junction of said resistor and capacitor and the succeeding tank circuit.

3. The invention as defined in claim 1 wherein said devices are capacitive and wherein the capacity of said devices varies inversely as the voltage applied thereto.

4. A multiple tuned reactance filter comprising: a plurality of resonant tank circuits, each tank circuit including a fixed inductor connected in parallel with a variable reactance device; a variable reactance device coupling each of said resonant tank circuits in tandem; a signal input circuit connected across the first of said resonant tank circuits, said signal input circuit including a variable reactance device in series with a fixed capacitor, said signal being applied across said fixed capacitor; each of said variable reactance devices being a semi-conductor diode having an anode and a cathode, and being essentially capacitive and having characteristics such that capacity varies inversely with applied voltage; a source of positive variable direct voltages; means separately connecting the cathodes of each of said devices to said source, whereby the resonant frequency of said tank circuits may be changed by varying the voltage of said source while the pass band characteristic and the input impedance of said filter may be maintained relatively constant.

5. The invention as defined in claim 4 wherein means are provided for simultaneously adjusting in one direction the positive voltage applied to the cathodes of said diodes in said tank circuits while adjusting in the opposite direction the voltage applied to the cathode of said diodes coupling said tank circuits whereby the resonant frequency of said filter remains unchanged while the pass band characteristics of said filter may be increased or decreased.

References Cited in the file of this patent

UNITED STATES PATENTS

| | | |
|---|---|---|
| 1,875,837 | Wheeler | Sept. 6, 1932 |
| 1,896,065 | Budendom | Feb. 7, 1933 |
| 2,088,229 | Braden | July 27, 1937 |
| 2,290,705 | Pfost | July 21, 1942 |
| 3,038,072 | Proudfit | June 5, 1962 |

OTHER REFERENCES

McMahon and Chase: "Voltage-Variable Capacitor-State of the Art," Electronic Industries, December 1959, pages 90–94.